United States Patent [19]

Nakajima

[11] Patent Number: 5,959,202
[45] Date of Patent: Sep. 28, 1999

[54] DEVICE FOR DETERMINING INITIAL CORRECTION FACTOR FOR CORRECTING ROTATIONAL VELOCITY OF TIRE

[75] Inventor: Mikao Nakajima, Itami, Japan

[73] Assignees: Sumitomo Electric Industries, Ltd., Osaka; Sumitomo Rubber Industries, Ltd., Hyogo, both of Japan

[21] Appl. No.: 08/990,532

[22] Filed: Dec. 15, 1997

[30] Foreign Application Priority Data

Jan. 27, 1997 [JP] Japan .................................. 9-012748

[51] Int. Cl.$^6$ .................................................. B60C 23/02
[52] U.S. Cl. .......................... 73/146.2; 340/444; 701/70; 702/140
[58] Field of Search ........................... 73/146.2; 340/444; 702/148, 140; 701/70

[56] References Cited

U.S. PATENT DOCUMENTS

| 5,179,526 | 1/1993 | Zimmer et al. . |
| 5,415,468 | 5/1995 | Latarnik et al. . |
| 5,578,984 | 11/1996 | Nakajima ............................ 73/146.2 X |
| 5,699,251 | 12/1997 | Mori et al. ........................... 340/444 X |

FOREIGN PATENT DOCUMENTS

| 0 510 466 A1 | 10/1992 | European Pat. Off. . |
| 0826 968 A1 | 3/1998 | European Pat. Off. . |
| 63-305011 | 12/1988 | Japan . |
| 4-212609 | 8/1992 | Japan . |

OTHER PUBLICATIONS

"Comparative Diagnosis of Tyre Pressures", Helmut Mayer; Institute for Industrial Information Systems, University of Karlsruhe, Germany; Proceedings of the Conference on Control Applications, Glasgow, Aug. 24–26, 1994; vol. 1, pp. 627–632 XP 000682538.

Primary Examiner—Joseph L. Felber
Attorney, Agent, or Firm—Rabin & Champagne, P.C.

[57] ABSTRACT

A device for finding correction factors for correcting outputs of rotational velocity detectors used for detecting the rotational velocities of four tires mounted on a vehicle. The device judges whether or not the vehicle is traveling linearly. If the vehicle is traveling linearly, an initial correction factor $K_1$ for eliminating the effect of a difference in effective rolling radius between the right and left front tires, and an initial correction factor $K_2$ for eliminating the effect of a difference in effective rolling radius between the right and left rear tires, are calculated on the basis of the outputs of the rotational velocity detectors. When it is judged that the vehicle is coasting linearly, an initial correction factor $K_3$ for eliminating the effect of a difference in effective rolling radius between the front tire and the rear tire is calculated.

11 Claims, 8 Drawing Sheets

DEVICE FOR DETERMINING INITIAL CORRECTION FACTOR FOR CORRECTING ROTATIONAL VELOCITY OF TIRE

BACKGROUND OF THE INVENTION

1. Field of the Invention

The present invention relates to an initial correction factor operating device used for a tire pressure drop detecting device, for example, for finding an initial correction factor for eliminating the effect on the rotational velocities of the tires by a difference in effective rolling radius depending on an initial difference between tires.

2. Description of Related Art

In recent years, as a safety device of a four-wheel vehicle such as an automobile or a truck, devices for detecting the drop in air pressure of a tire (DWS) have been developed, and some of them have been put to practical use.

An example of a method of detecting the drop in air pressure of a tire is a method utilizing a difference among the respective rotational velocities $F_1$, $F_2$, $F_3$, and $F_4$ of four tires $W_1$, $W_2$, $W_3$, and $W_4$ mounted on a vehicle. This method utilizes the fact that the rotational velocity $F_i$ (i=1, 2, 3, 4) changes depending on the condition of the air pressure of the tire $W_i$. That is, when the air pressure of any one of the tires $W_i$ drops, the effective rolling radius of the tire $W_i$ decreases. As a result, the rotational velocity $F_i$ of the tire $W_i$ increases. Therefore, the drop in the air pressure of the tire $W_i$ can be judged on the basis of the difference in the rotational velocity $F_i$.

The effective rolling radius is a value obtained by dividing the travel distance of the tire $W_i$ in one free rotation in a loaded state by $2\pi$.

A judged value used in detecting the drop in the air pressure of the tire $W_i$ on the basis of the difference in the rotational velocity $F_i$ is found, for example, by the following equation (1), for example (see Japanese Patent Laid-Open (KOKAI) No. 305011/1988, Japanese Patent Laid-Open (KOKAI) No. 212609/1992, etc.).

$$D = \frac{\frac{F_1+F_4}{2} - \frac{F_2+F_3}{2}}{\frac{F_1+F_2+F_3+F_4}{4}} \times 100 \qquad (1)$$

If all the effective rolling radii of the tires $W_i$ are the same, the respective rotational velocities $F_i$ are the same ($F_1=F_2=F_3=F_4$). In this case, the judging value D is zero. Therefore, thresholds $D_{TH1}$ and $D_{TH2}$ (where $D_{TH1}$, $D_{TH2}>0$) are set. When the condition indicated by the following expression (2) is satisfied, it is judging that there is a tire $W_i$ whose air pressure has dropped. When the condition is not satisfied, it is judged that all the tires $W_i$ have normal internal pressure.

$$D < -D_{TH1} \text{ or } D > D_{TH2} \qquad (2)$$

The effective rolling radius of actual tires varies within a fabrication tolerance (such variation is referred to as an "an initial difference" hereinafter). That is, even if all of the four tires $W_i$ have normal internal pressure, the effective rolling radii of the four tires $W_i$ differ due to the initial difference. Correspondingly, the rotational velocities $F_i$ of the tires $W_i$ vary. As a result, the judging value D may be a value other than zero. Therefore, it may be erroneously detected that the air pressure has dropped, although it has not dropped. In order to detect the drop in the air pressure with high precision, therefore, it is necessary to eliminate the effect of the initial difference from the detected rotational velocity $F_i$.

SUMMARY OF THE INVENTION

It may be considered that as a technique for eliminating the effect of an initial difference from rotational velocities $F_i$, a technique proposed in Japanese Patent Application Serial No. 8-58039 (not published as of the filing data of the present application) is applied. In the technique, initial correction factors $K_1$, $K_2$, and $K_3$ are calculated as expressed by the following equations (3) to (5):

$$K_1 = F_1/F_2 \qquad (3)$$

$$K_2 = F_3/F_4 \qquad (4)$$

$$K_3 = \frac{F_1 + K_1 \times F_2}{F_3 + K_2 \times F_4} \qquad (5)$$

The initial correction factor $K_1$ is a factor for correcting a difference in effective rolling radius depending on an initial difference between right and left front tires $W_1$ and $W_2$. The initial correction factor $K_2$ is a factor for correcting a difference in effective rolling radius depending on an initial difference between right and left rear tires $W_3$ and $W_4$. The initial correction factor $K_3$ is a factor for correcting a difference in effective rolling radius depending on an initial difference between the front tire $W_1$ and the rear tire $W_3$.

The rotational velocities $F_i$ are corrected as expressed by the following equations (6) to (9) using the calculated initial correction factors $K_1$ to $K_3$, so that new rotational velocities $F1_i$ are found. Consequently, the effect of the initial difference on the rotational velocities $F_i$ is eliminated:

$$F1_1 = F_1 \qquad (6)$$

$$F1_2 = K_1 \times F_2 \qquad (7)$$

$$F1_3 = K_3 \times F_3 \qquad (8)$$

$$F1_4 = K_2 \times K_3 \times F_4 \qquad (9)$$

When the initial correction factors $K_1$ to $K_3$ are calculated, the vehicle must be coasting linearly (at a constant speed). That is, if the vehicle is coasting linearly, the effect of the slip factor of the tire hardly affects the rotational velocity $F_i$. As a result, the initial correction factors $K_1$ to $K_3$, faithfully representing a difference in effective rolling radius depending on the initial difference, can be obtained. Particularly, the initial correction factor $K_3$ is found on the basis of the ratio of the rotational velocities of a front tire and a rear tire on the same side, whereby the effect of a slip factor of a driving tire must be reliably eliminated upon setting driving torque or braking torque to approximately zero. In order to obtain the initial correction factor faithfully representing a difference in effective rolling radius depending on the initial difference, it is essential that the vehicle is caused to coast linearly.

On the other hand, the tire pressure drop detecting device according to the above-mentioned proposed technique does not comprise means for automatically detecting that a vehicle is coasting linearly. In the tire pressure drop detecting device according to the proposed technique, therefore, the calculation of the initial correction factors $K_1$ to $K_3$ is started in response to an operation of an initializing switch by a user. That is, when the initial correction factors $K_1$ to $K_3$ are calculated, the user operates the initializing switch upon intentionally causing the vehicle to coast linearly.

Consequently, the device is informed that the vehicle is coasting linearly.

A public road is generally considered to be a road on which the vehicle is caused to coast linearly. In view of present road environments such as chronic traffic jams and a small number of straight roads, it is difficult and not preferable from the point of view of traffic safety, to intentionally cause the vehicle to coast linearly on a public road. Therefore, a technique that can easily find a correct initial correction factor has been desired.

An object of the present invention is to provide an initial correction factor determining device capable of simply finding a correct initial correction factor.

Another object of the present invention is to provide a device capable of finding a correct initial correction factor even if a user does not give special attention to the calculation of the initial correction factor.

A device according to the present invention comprises means for judging whether or not a vehicle is traveling linearly, and means for calculating an initial correction factor $K_1$ for eliminating the effect of a difference in effective rolling radius caused by an initial difference between right and left front tires, upon rotational velocities of the tires, and an initial correction factor $K_2$ for eliminating the effect of a difference in effective rolling radius caused by an initial difference between right and left rear tires, upon the rotational velocities of the tires on the basis of an output of the rotational velocity detecting means, when the vehicle is judged to be traveling linearly.

When the vehicle is traveling on a public road, the vehicle will be temporarily traveling linearly, although it is not coasting or coasting linearly.

The device according to the present invention is so adapted in view of the foregoing point as to judge whether or not the vehicle is traveling linearly, and calculate, when the vehicle is traveling linearly, the initial correction factors $K_1$ and $K_2$ even if the vehicle is not coasting. Consequently, it is possible to simply calculate correct initial correction factors even if a user does not intentionally cause the vehicle to travel linearly.

The device according to one embodiment of the present invention further comprises means for judging whether or not the vehicle is coasting, and means for calculating an initial correction factor $K_3$ for eliminating the effect of a difference in effective rolling radius that depends on an initial difference between the front tire and the rear tire on the rotational velocities of the tires on the basis of the calculated initial correction factors $K_1$ and $K_2$ and the output of the rotational velocity detecting means, provided that the vehicle is judged to be traveling linearly, and to be coasting.

Consequently, the initial correction factors $K_1$ to $K_3$ are calculated upon automatically detecting that the vehicle is coasting linearly, and therefore the user need not intentionally cause the vehicle to coast linearly, so that it is possible to easily calculate a correct initial correction factor.

The device according to one embodiment of the present invention further comprises means for judging whether or not the vehicle is cornering, means for finding the slip factor Rs of the tire, and means for calculating an initial correction factor $K_3$ for eliminating the effect of the difference in effective rolling radius that depends on the initial difference between the front tire and the rear tire on the rotational velocities of the tires, by substituting the output of the rotational velocity detecting means, the calculated initial correction factors $K_1$ and $K_2$, and the calculated slip factor Rs into a predetermined operation expression when it is judged that the vehicle is cornering.

The device may further comprise means for calculating a judging value D for judging the drop in air pressure of the tire on the basis of the output of the rotational velocity detecting means. In this case, it is preferable that the means for finding the slip factor Rs substitutes the lateral acceleration LA of the vehicle and the judging value D into a predetermined operation expression, to find the slip factor Rs of the tire.

The device according to one embodiment of the present invention further comprises means for calculating the lateral acceleration LA of the vehicle on the basis of the output of the rotational velocity detecting means, means for calculating a judging value D for judging the drop in air pressure of the tire on the basis of the output of the rotational velocity detecting means, means for substituting the lateral acceleration LA of the vehicle and the judging value D thus calculated into a predetermined first operation expression, to find the slip factor Rs of the tire, and means for calculating an initial correction factor $K_3$ for eliminating the effect of the difference in effective rolling radius that depends on the initial difference between the front tire and the rear tire on the rotational velocities of the tires, by substituting the output of the rotational velocity detecting means, the calculated initial correction factors $K_1$ and $K_2$, and the calculated slip factor Rs into a predetermined second operation expression, on condition that it is judged that the vehicle is cornering.

The initial correction factors $K_1$ to $K_3$ are used for the purpose of eliminating the effect of the initial difference from the rotational velocities $F_1$, $F_2$, $F_3$ and $F_4$ of the respective tires in finding the judging value D for judging the drop in air pressure of the tire, for example. On the other hand, the rotational velocities $F_1$ to $F_4$ also vary depending on the movement of the load on the vehicle at the time of cornering. In finding the judging value D, therefore, the variations in the rotational velocities $F_1$ to $F_4$ due to the movement of the load on the vehicle is preferably corrected. An equation used for the correction is the following equation (10), for example. In the following equation (10), A1 and A2 are constants:

$$D'=D-(A1 \times LA + A2 \times LA \times Rs) \tag{10}$$

The slip factor Rs corresponds to the ratio of the rotational angular velocity of the driving tire to the rotational angular velocity of the following tire, so that it can be expressed by the following equation (11) in the case of an FF (front engine front drive) vehicle, for example:

$$Rs = \frac{F_1 + K_1 \times F_2}{K_3 \times F_3 + K_2 \times K_3 \times F_4} - 1 \tag{11}$$

On the other hand, the initial correction factors $K_1$ to $K_3$ are generally calculated when all the four tires have normal internal pressure, for example, after the tires are replaced. If the initial correction factors $K_1$ to $K_3$ are accurately determined, therefore, a judging value D' should be zero during cornering. If zero is substituted into D' in the foregoing equation (10), solving the equation for the slip factor Rs, therefore, gives the following equation (12). The equation (12) corresponds to a first operation expression.

$$Rs = \frac{D - A1 \times LA}{A2 \times LA} \tag{12}$$

The slip factor Rs can thus be calculated on the basis of the lateral acceleration LA of the vehicle and the judging value D.

When the slip factor Rs expressed by the equation (12) is substituted into the foregoing equation (11), to arrange the equation with respect to $K_3$, the following equation (13) is obtained. The equation (13) corresponds to a second operation expression.

$$K_3 = \frac{1}{Rs+1} \times \frac{F_1 + K_1 \times F_2}{F_3 + K_2 \times F_4} \tag{13}$$

The initial correction factor $K_3$ can be thus calculated on the basis of the initial correction factors $K_1$ and $K_2$, the slip factor Rs, and the rotational angular velocities $F_1$ to $F_4$.

The equation (13) for calculating the initial correction factor $K_3$ is derived from an equation for eliminating the movement of the load on the vehicle at the time of cornering, from the rotational angular velocity $F_i$. When the vehicle is cornering, therefore, a precise initial correction factor $K_3$ can be calculated. Even if the vehicle is not linearly coasting at the time of usual traveling, for example, the precise initial correction factor $K_3$ can be calculated if the vehicle is only cornering.

When the vehicle is cornering, an error may be included in the initial correction factor $K_3$ depending on the value of the slip factor Rs. If the device further comprises means for judging whether or not the slip factor Rs takes a value within a predetermined range, and means for inhibiting the calculation of the initial correction factor $K_3$ when it is judged that the slip factor Rs is in the range, it is possible to prevent the initial correction factor $K_3$ from being erroneously calculated.

The device according to one embodiment of the present invention further comprises means for judging whether or not the vehicle is coasting, and means for calculating an initial correction factor Kx for eliminating the effect of the difference in effective rolling radius depending on the initial difference between the front tire and the rear tire, on the rotational velocities of the tires on the basis of the calculated initial correction factors $K_1$ and $K_2$ and the output of the rotational velocity detecting means, when it is judged that the vehicle is linearly traveling and it is also judged that the vehicle is coasting. The device further includes means for judging whether or not the vehicle is cornering, means for calculating the slip factor Rs of the tire, and means for calculating an initial correction factor Ky for eliminating the effect of the difference in effective rolling radius depending on the initial difference between the front tire and the rear tire, on the rotational velocities of the tires, by substituting the output of the rotational velocity detecting means the calculated initial correction factors $K_1$ and $K_2$, and the calculated slip factor Rs into a predetermined operation expression when it is judged that the vehicle is cornering. Also included are means for judging which of the calculated initial correction factors Kx and Ky is higher in precision, and means for taking the initial correction factor which is judged to be higher in precision as the final initial correction factor $K_3$ for eliminating the effect of the difference in effective rolling radius depending on the initial difference between the front tire and the rear tire, on the rotational velocities of the tires.

The device may further comprise means for calculating a judging value D for judging the drop in air pressure of the tire, on the basis of the output of the rotational velocity detecting means. In this case, it is preferable that the means for finding the slip factor Rs is a means for substituting the lateral acceleration LA of the vehicle and the calculated judging value D into a predetermined operation expression, to find the slip factor Rs of the tire.

The device according to one embodiment of the present invention further comprise means for judging whether or not the vehicle is coasting, and means for calculating an initial correction factor Kx for eliminating the effect of the difference in effective rolling radius depending on the initial difference between the front tire and the rear tire, on the rotational velocities of the tires, on the basis of the calculated initial correction factors $K_1$ and $K_2$ and the output of the rotational velocity detecting means, when the vehicle is judged to be linearly traveling and coasting. The device of this embodiment further includes means for calculating the lateral acceleration LA of the vehicle on the basis of the output of the rotational velocity detecting means, and means for calculating a judging value D for judging the drop in air pressure ol the tire on the basis of the output of the rotational velocity detecting means, means for substituting the lateral acceleration LA of the vehicle and the judging value D thus calculated into a predetermined first operation expression, to calculate the slip factor Rs of the tire, and means for judging whether or not the vehicle is cornering on the basis of the calculated lateral acceleration LA of the vehicle. Also included are means for calculating an initial correction factor Ky for eliminating the effect on the rotational velocities of the tires of the difference in effective rolling radius depending on the initial difference between the front tire and the rear tire, by substituting the output of the rotational angular velocity detecting means, the calculated initial correction factors $K_1$ and $K_2$, and the calculated slip factor Rs into a predetermined second operation expression when the vehicle is judged to be cornering, and means for judging which of the calculated initial correction factors Kx and Ky is higher in precision. A means also is provided for taking the initial correction factor which is higher in precision as the final initial correction factor $K_3$ for eliminating the effect on the rotational velocities of the tires of the difference in effective rolling radius depending on the initial difference between the front tire and the rear tire.

According to the above-mentioned construction, the initial correction factor Kx calculated in a case where the vehicle is linearly coasting and the initial correction factor Ky calculated in a case where the vehicle is cornering, are compared in order to judge which of the initial correction factors is higher in precision. The initial correction factor which is higher in precision is taken as the final initial correction factor $K_3$. Consequently, a more precise initial correction factor $K_3$ can be obtained, as compared with that in a case where only one of the factors Kx or Ky is calculated and always used as the initial correction factor $K_3$.

Also in this case, it is preferable that the calculation of the initial correction factor $K_3$ is inhibited when the slip factor Rs is in a predetermined range.

In the device according to one embodiment of the present invention, the means for calculating the initial correction factor Kx includes means for subjecting a plurality of data to an averaging operation, and the means for calculating the initial correction factor Ky includes means for subjecting a plurality of data to an averaging operation. The means for judging which of the initial correction factors Kx and Ky is higher in precision includes means for judging the precision on the basis of the numbers of data which have been subjected to the respective averaging operations.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
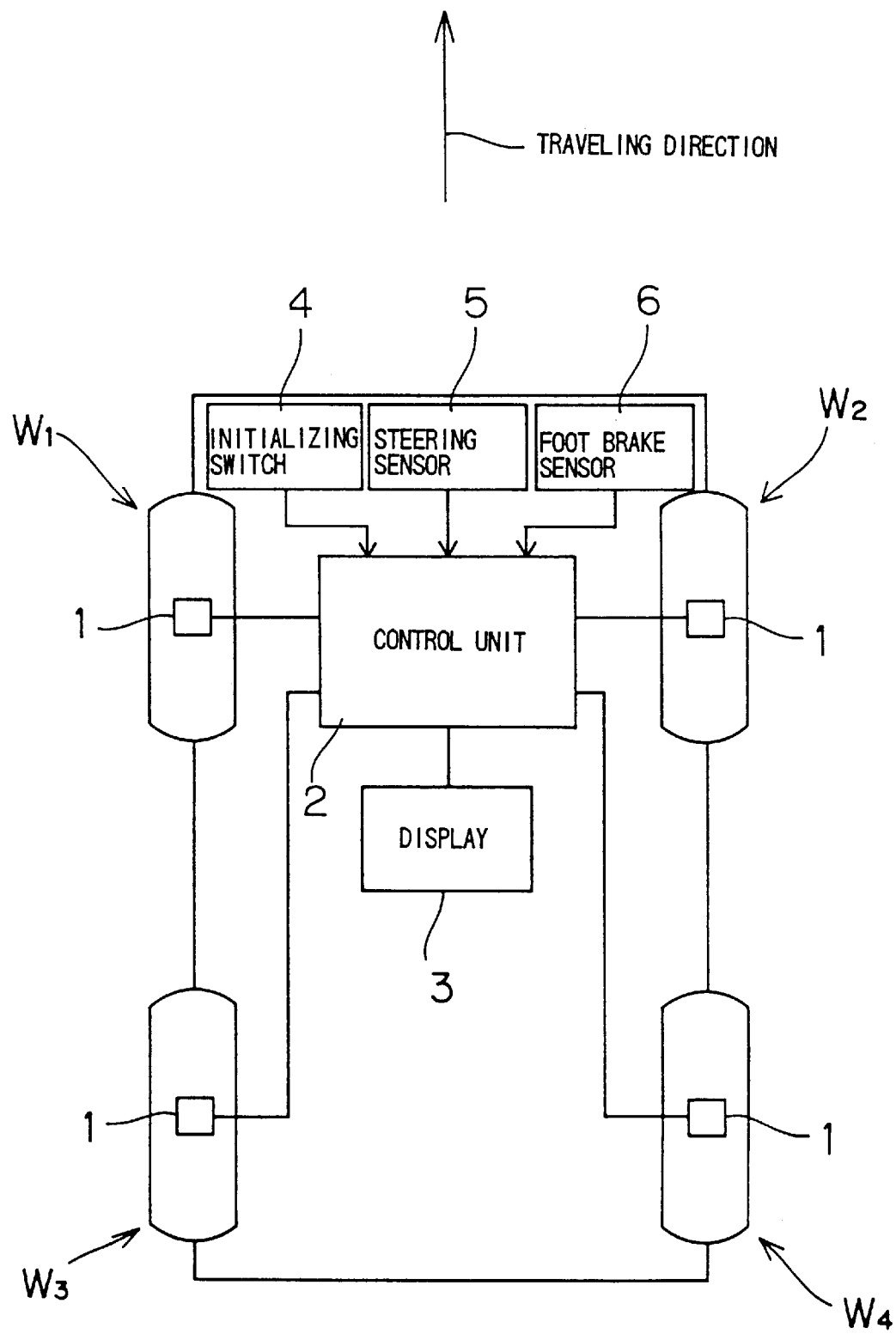
FIG. 1 is a schematic block diagram showing the construction of a tire pressure drop detecting device to which one embodiment of the present invention is applied.

FIG. 1 is a block diagram showing the construction of a tire pressure drop detecting device to which one embodiment of the present invention is applied. The tire pressure drop detecting device determines whether or not the air pressure of any of four tires $W_1$, $W_2$, $W_3$, and $W_4$ provided in a four-wheel vehicle drops. The tires $W_1$ and $W_2$ respectively correspond to right and left front tires. The tires $W_3$ and $W_4$ respectively correspond to right and left rear tires.

A wheel speed sensor 1 is provided in relation to each of the tires $W_1$, $W_2$, $W_3$, and $W_4$. Outputs of the wheel speed sensors 1 are fed to a control unit 2.

A display 3 is connected to the control unit 2. The display 3 is for reporting the tire $W_i$ (i=1, 2, 3, 4) whose air pressure has dropped, and may be constituted by a liquid crystal display device, a plasma display device, a CRT (Cathode-Ray Tube), or the like.

An initializing switch 4 is also connected to the control unit 2. The initializing switch 4 is operated by a user in calculating initial correction factors $K_j$ (j=1, 2, 3) for eliminating the effect of an initial difference between the tires $W_i$. The initial difference means a variation between the tires $W_i$ in effective rolling radius within a fabrication tolerance.

A steering sensor 5 for detecting the angle of rotation of a steering wheel (not shown) and a foot brake sensor 6 for determining whether or not a foot brake (not shown) is depressed, are further connected to the control unit 2.

Figure 2:
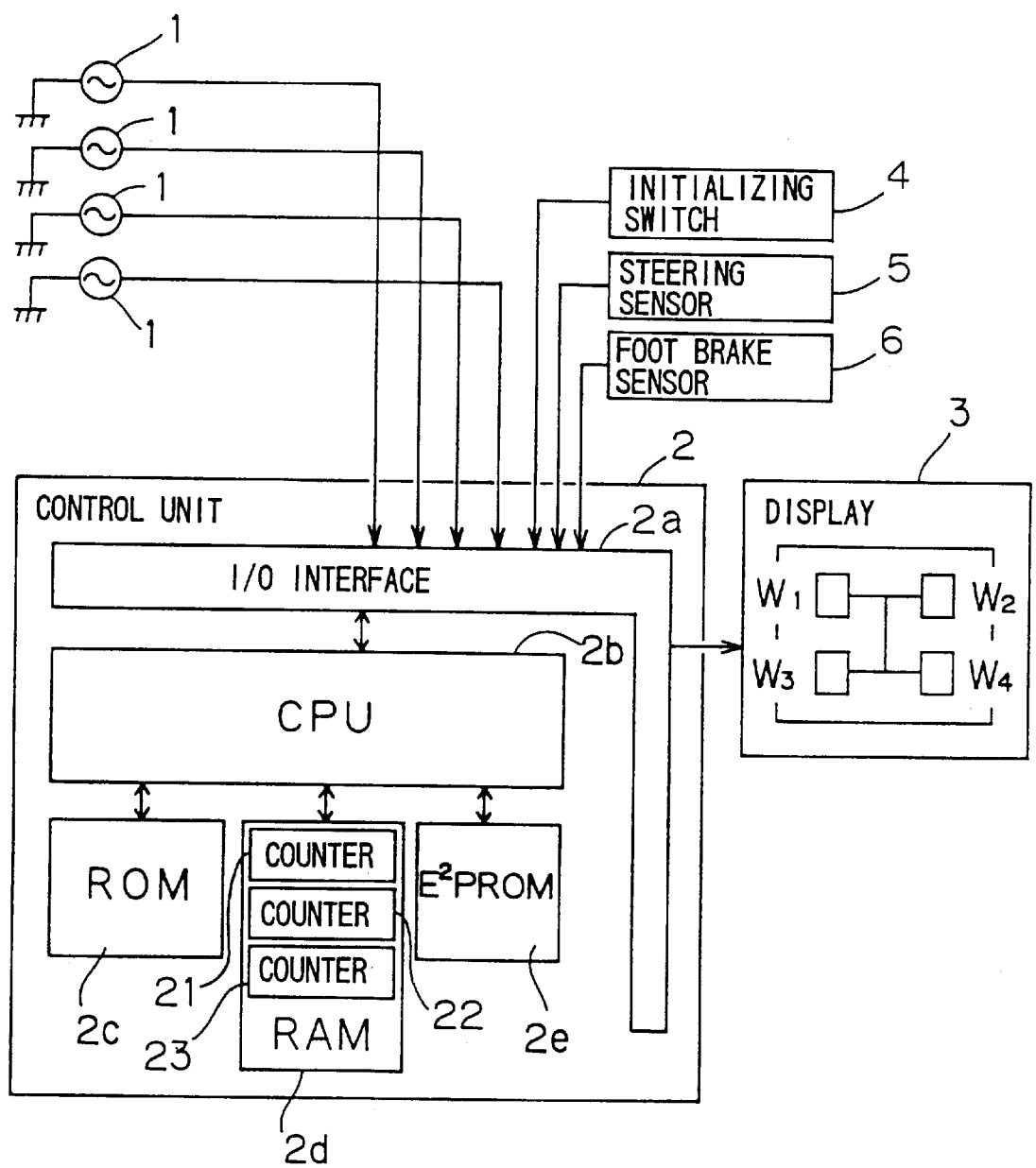
FIG. 2 is a block diagram showing the electrical construction of a tire pressure drop detecting device.

FIG. 2 is a block diagram showing the electrical construction of the tire pressure drop detecting device. The control unit 2 is constituted by a microcomputer including an I/O interface 2a, a CPU 2b, a ROM 2c, a RAM 2d, and an EEPROM 2e.

The I/O interface 2a is required to receive signals from external devices such as the wheel speed sensors 1, the initializing switch 4, the steering sensor 5 and the foot brake sensor 6. The CPU 2b is for performing various operational processes in accordance with a control operation program stored in the ROM 2c. The RAM 2d is one to which data or the like is temporarily written when the CPU 2b performs a control operation and from which the written data or the like is read out. A part of a storage area of the RAM 2d is utilized as counters 21, 22, and 23 for initialization processing to be described later. The EEPROM 2e stores data representing a relational expression for specifying a coasting range, which is a range of the front/rear acceleration FRA of the vehicle at which the vehicle is judged to be coasting.

The wheel speed sensor 1 outputs a pulse signal corresponding to the speed of rotation of the tire $W_i$ (hereinafter referred to as "wheel speed pulses"). In the CPU 2b, the rotational velocity $F_i$ of each of the tires $W_1$ is calculated for each predetermined sampling period $\Delta T$ (for example, $\Delta T=1$ (sec)) on the basis of the wheel speed pulses outputted from the wheel speed sensor 1.

Figure 3:
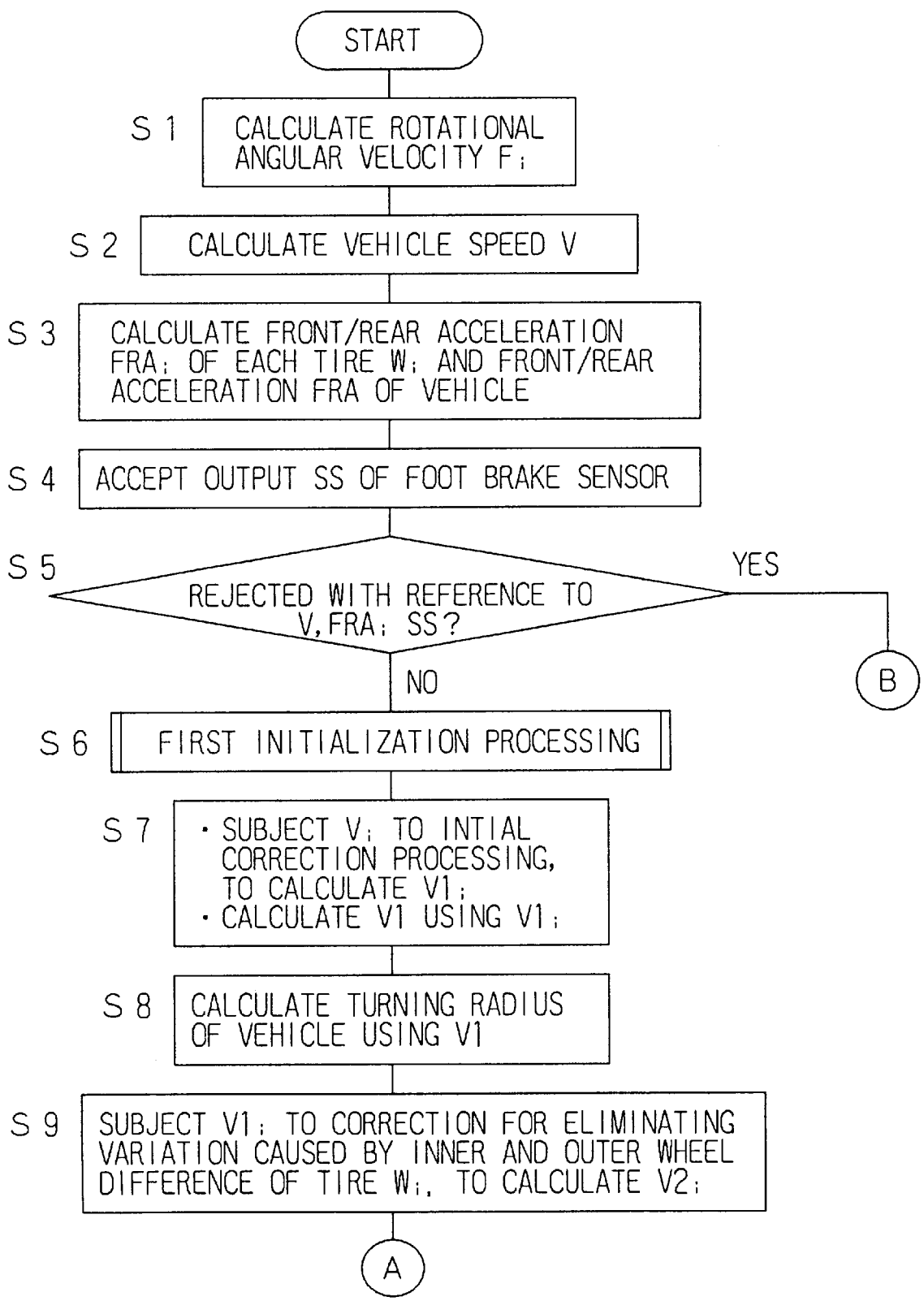
FIGS. 3 and 4 show respective first and second parts of a flow chart for use in explaining the entire tire pressure drop detection processing.
Figure 4:
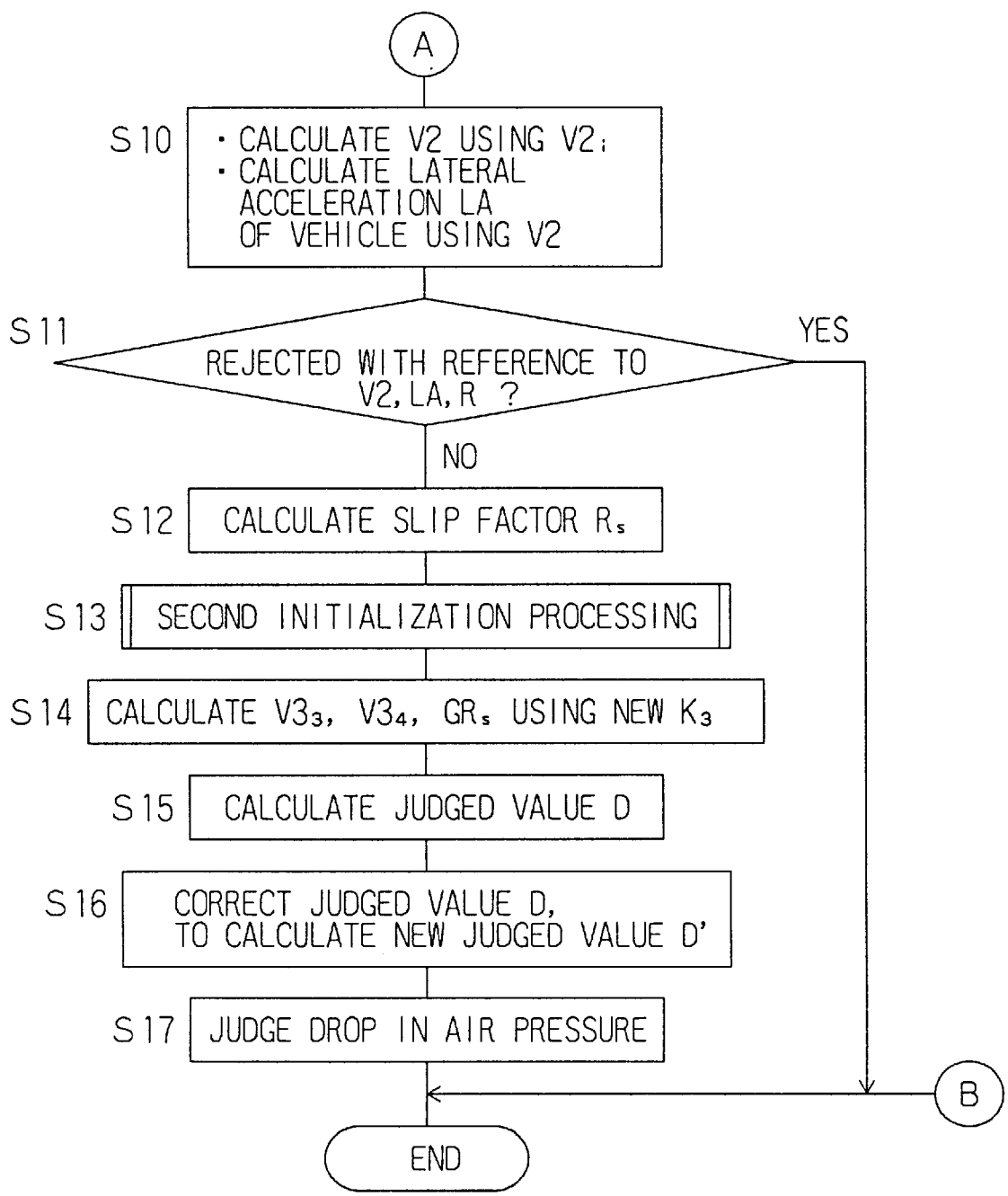

FIGS. 3 and 4 are parts of a flow chart for explaining processing for detecting the air pressure of a tire in the tire pressure drop detecting device. The CPU 2b operates in accordance with the predetermined program stored in the ROM 2c, so that the processing is repeatedly performed each sampling period $\Delta T$ by the control unit 2. In the following description, it is presupposed that an objective vehicle is a front engine front drive (FF) vehicle.

The CPU 2b calculates the rotational velocity $F_i$ of each of the tires $W_i$ on the basis of wheel speed pulses outputted from the wheel speed sensor 1 (step S1 in FIG. 3). Judgment processing to determine whether the calculated rotational velocity $F_i$ should be used or rejected, is then performed, wherein the judgement is based on whether or not the calculated rotational velocity $F_i$ is likely to include an error.

More specifically, the rotational velocity $F_i$ may include an error depending on the speed of the vehicle (hereinafter referred to as "vehicle speed"), the front/rear acceleration of each of the tires $W_i$, the turning radius of the vehicle and the lateral acceleration of the vehicle, or may include an error when the foot brake is depressed.

More specifically, when the vehicle speed is significantly low, the precision of detection of wheel speed by sensor 1 is significantly decreased, whereby it is highly possible that the calculated rotational velocity $F_i$ includes an error. Further, when the front/rear acceleration of each of the tires $W_i$ is relatively large, or the foot brake is depressed, the effect of a slip of the tire $W_i$ due to rapid acceleration or rapid deceleration of the vehicle, for example, is considered, whereby it is highly possible that the calculated rotational velocity $F_i$ includes an error. Furthermore, when the turning radius of the vehicle is relatively small, or the lateral acceleration of the vehicle is relatively large, the tire $W_i$ may slip laterally, whereby it is highly possible that the calculated rotational velocity $F_i$ includes an error.

When it is thus highly possible that the rotational velocity $F_i$ includes an error, it is preferable that use of the so calculated rotational velocity $F_i$ is rejected, so as not to be employed for detecting the drop in air pressure.

On the other hand, the lateral acceleration of the vehicle is proportional to the square of the vehicle speed. In a case where the vehicle speed is calculated on the basis of the rotational velocity $F_i$, therefore, when the rotational velocity $F_i$ varies, the effect of the variation on the lateral acceleration of the vehicle rapidly increases as the vehicle speed increases. Therefore, a large error may be included in the lateral acceleration of the vehicle.

One cause of the variation in the rotational velocity $F_i$ is the variation in the effective rolling radius of each of the tires $W_i$ caused by on the initial difference. Further, in a case where the vehicle is cornering the difference between the radius of (1) the inside of the tire $W_i$ and (2) the outside of the tire $W_i$ (an inner and outer wheel difference) is also a cause of the variation in the rotational velocity $F_i$.

Therefore, it is preferable that a judgment whether to reject the $F_i$ calculation based on the lateral acceleration of the vehicle is made after the effects of the initial difference and the inner and outer wheel difference are eliminated from the calculated rotational velocity $F_i$.

Furthermore, when the effect of the inner and outer wheel difference is eliminated from the calculated rotational velocity Fi, the turning radius of the vehicle is used, as described later, as a parameter for such elimination. When the vehicle is cornering and it's turning radius is calculated on the basis of the rotational velocity $F_i$, an error in the calculation of turning radius of the vehicle may occur due to the movement of the load toward the outside of the corner. When the turning radius of the vehicle is found, therefore, the effect thereon of the movement of the load on the vehicle must be eliminated. However, the amount of movement of the load on the vehicle is proportional to the vehicle speed. When the vehicle speed is calculated on the basis of the rotational velocity $F_i$, therefore, the effect on the calculated turning radius of the vehicle of the variation in the calculated rotational velocity $F_i$, depending on the initial difference, increases as the vehicle speed increases. Therefore, it is preferable that the judgment whether to reject based on the turning radius of the vehicle is made after the effect of the initial difference is eliminated from the calculated rotational velocity $F_i$.

In the present embodiment, therefore, a judgment whether to reject is made twice. Specifically, a judgment whether to reject based on the vehicle speed $V_1$, the front/rear acceleration FRAi of each of the tires $W_i$ and the status of foot brake, is first made. A judgment whether to reject based on the speed V2 of the vehicle, the lateral acceleration LA of the vehicle and the turning radius R of the vehicle, is then made after the effects of the initial difference and the inner and outer wheel difference are eliminated.

The CPU 2b calculates the vehicle speed V and the front/rear acceleration $FRA_i$ of each of the tires $W_i$ after calculating the rotational velocity $F_i$, and further accepts an output SS of the foot brake sensor 6 (steps S2, S3, and S4). Further, when the front/rear acceleration $FRA_i$ of each of the tires $W_i$ is calculated, the front/rear acceleration FRA of the vehicle used in the first initialization processing in the step S6 is also calculated.

The vehicle speed V is calculated on the basis of the speed $V_i$ of each of the tires $W_i$. The speed $V_i$ of each of the tires $W_i$ is calculated in accordance with the following equation (20), where r is a constant corresponding to the effective rolling radius at the time of traveling linearly, and is stored in the ROM 2c:

$$V_i = r \times F_i \tag{20}$$

The vehicle speed V is calculated by the following equation (21) on the basis of the calculated speed $V_i$ of each of the tires $W_i$:

$$V = (V_1 + V_2 + V_3 + V4)/4 \tag{21}$$

The front/rear acceleration $FRA_i$ of each of the tires $W_i$ is calculated by the following equation (22), letting $BV_i$ be the speed of the tire $W_i$ calculated in the preceding sampling period:

$$FRA_i = (V_i - BV_i)/(\Delta T \times 9.8) \tag{22}$$

9.8 is inserted in the denominator in the foregoing equation (22) in order to convert the front/rear acceleration $FRA_i$ of each of the tires $W_i$ to gravitational acceleration (G).

The front/rear acceleration FRA of the vehicle is calculated by the following equation (23) on the basis of the front/rear acceleration $FRA_i$ of each of the tires $W_i$:

$$FRA = (FRA_1 + FRA_2 + FRA_3 + FRA_4)/4 \tag{23}$$

The vehicle speed V and the front/rear acceleration FRA of the vehicle may be directly detected using sensors.

It is then judged whether or not the rotational velocity $F_i$ calculated for the current sampling period is rejected on the basis of the vehicle speed V and the front/rear acceleration $FRA_i$ of each of the tires $W_i$ which are thus calculated, and the output SS of the foot brake sensor 5 (step S5). Specifically, when any one of the following conditions ① to ③ is satisfied, the rotational velocity $F_i$ is rejected:

①$V < V_{TH}$ (for example, $V_{TH}$=10 (km/h))

② MAX {|$FRA_i$|} >$A_{TH}$ (for example, $A_{TH}$=0.1 g: g=9.8 (m/sec$^2$))

③ The foot brake is depressed.

When the rotational velocity $F_i$ is not rejected, the CPU 2b performs first initialization processing (step S6). The first initialization processing is processing for calculating initial correction factors $K_j$(j=1, 2, 3) when the vehicle is coasting linearly.

The initial correction factor $K_1$ is a factor that corrects for the difference in effective rolling radius, depending on the initial difference between the right and left front tires $W_1$ and $W_2$. The initial correction factor $K_2$ is a factor that corrects for the difference in effective rolling radius, depending on the initial difference between the right and left rear tires $W_3$ and $W_4$. The initial correction factor $K_3$ is a factor that corrects for the difference in effective rolling radius, depending on the initial difference between the left front tire $W_1$ and the left rear tire $W_3$. An initial correction factor $K_3$ calculated in the first initialization processing is stored as an initial correction factor BK3 in the RAM 2d.

Thereafter, the CPU 2b corrects the speed $V_i$ of each of the tires $W_i$ using the initial correction factors $K_j$ calculated in the first initialization processing (step S7). More specifically, the speed $V_i$ of each of the tires $W_i$ is corrected as expressed by the following equations (24) to (27), to acquire new speeds $V1_i$:

$$V1_1 = V_1 \tag{24}$$

$$V1_2 = K_1 \times V_2 \tag{25}$$

$$V1_3 = BK_3 \times V_3 \tag{26}$$

$$V1_4 = K_2 \times BK_3 \times V_4 \tag{27}$$

The vehicle speed $V_1$ is calculated as expressed by the following equation (28) on the basis of the speed $V1_i$ of each of the tires $W_i$ after the correction. Consequently, the speed $V_1$ of the vehicle, from which the effect of the initial difference has been eliminated, is obtained.

$$V_1 = (V1_1 + V1_2 + V1_3 + V1_4)/4 \tag{28}$$

The turning radius R of the vehicle is then calculated on the basis of the vehicle speed $V_1$ (step S8). More specifically, the turning radius R' of the vehicle is first calculated as expressed by the following equation (29). In the equation (29), Tw is the distance between the right wheel and the left wheel:

$$R' = \frac{Tw}{2} \times \frac{V1_4 + V1_3}{V1_4 - V1_3} \tag{29}$$

The turning radius R' of the vehicle is then subjected to such correction as to eliminate the effect of the movement of the load on the vehicle. Specifically, it is subjected to correction as expressed by the following equation (30):

$$R = R' \times \{u_1 + u_2(V1_3 + V1_4)^2\} \tag{30}$$

For $u_1$ and $u_2$ of equation (30), suitable values are defined in the following equations (31) through (33). In equation (33), Q is the load on the vehicle, H is the height from the ground plane of the tire to the center of gravity of the vehicle, and $\alpha$ is the rate of variation in the effective rolling radius of the tire $W_i$ with respect to the load.

$$u_1 = 1 \tag{31}$$

$$u_2 = \frac{1}{9.8} \times \frac{\beta}{2Tw} \tag{32}$$

$$\text{where } \beta = \frac{Q \times H \times \alpha}{Tw \times 100} \tag{33}$$

The CPU 2b then further subjects the speed $V1_i$ of each of the tires $W_i$, from which the effect of the initial difference has been eliminated, to correction for eliminating the effect of the inner and outer wheel difference on the basis of the calculated turning radius R of the vehicle (step S9). Specifically, the speed $V2_i$ of each of the tires $W_i$ after the correction is calculated, as expressed by the following equations (34) to (37), where WB is a wheel base:

$$V2_1 = \frac{|R|}{\sqrt{\{(R-Tw/2)^2 + WB^2\}}} \times VI_1 \tag{34}$$

$$V2_2 = \frac{|R|}{\sqrt{\{(R+Tw/2)^2 + WB^2\}}} \times VI_2 \tag{35}$$

$$V2_3 = \frac{|R|}{|R-Tw/2|} \times VI_3 \tag{36}$$

$$V2_4 = \frac{|R|}{|R+Tw/2|} \times VI_4 \tag{37}$$

The vehicle speed $V_2$ is then calculated as expressed by the following equation (38) on the basis of the calculated speed $V2_i$ of each of the tires $W_i$ after the correction (step S10 in FIG. 4). Consequently, the speed $V_2$ from which the effects of the initial difference and the inner and outer wheel difference have been eliminated, is obtained:

$$V_2 = (V2_1 + V2_2 + V2_3 + V2_4)/4 \tag{38}$$

The CPU 2b then calculates the lateral acceleration LA of the vehicle as expressed by the following equation (39), on the basis of the found vehicle speed $V_2$ and the found turning radius R of the vehicle (step S10):

$$LA = V2_2/(R \times 9.8) \tag{39}$$

9.8 is inserted in the denominator in order to convert the lateral acceleration LA of the vehicle to gravitational acceleration (G).

Furthermore, a judgment is made whether or not to reject the rotational velocity $F_i$ calculated in the current sampling period on the basis of the vehicle speed $V_2$, the lateral acceleration LA of the vehicle, and the turning radius R of the vehicle, which are calculated in the foregoing manner (step S11). Specifically, when any one of the following three conditions ④ to ⑥ is satisfied, the rotational angular velocity $F_i$ is rejected:

④ $V_2 < V_{TH}$ (for example, $V_{TH}$=10 (km/h))
⑤ $|LA| > LA_{TH}$ (for example, $LA_{TH}$=0.4 g)
⑥ $|R| < R_{TH}$ (for example, $R_{TH}$=30 m)

In the foregoing manner, a rotational velocity $F_i$ which is likely to include an error is eliminated.

The CPU 2b then calculates the slip factor Rs (step S12) as expressed by the following equation (40), on the basis of the speed $V2_i$ of each of the tires $W_i$ found in (step S10). The slip factor Rs is used in second initialization processing in step S13.

$$Rs = \frac{V2_1 + V2_2}{V2_3 + V2_4} - 1 \tag{40}$$

The second initialization processing calculates the initial correction factor $K_3$ when the vehicle is cornering.

The initial correction factor $K_3$ is obtained using both the first initialization processing and the second initialization processing, for two reasons. One is that the frequency of a vehicle's linear coasting during usual (normal) travel is relatively low, and another is to improve the precision of the initial correction factor $K_3$.

Specifically, the number of vehicles is large on a public road, so that the frequency of linear coasting by a particular vehicle during usual (normal) travel is limited. If the initial correction factor $K_3$ is calculated only when the vehicle is coasting linearly, there is a possibility that the initial correction factor $K_3$ cannot be rapidly calculated. If the second initialization processing is also used, then the initial correction factor $K_3$ can be calculated if the vehicle is cornering even when it does not coast linearly during its usual travel.

Furthermore, examples of public roads include not only roads having many relatively straight portions, such as a highway, but also roads having many curves such as mountain roads. Consequently, the first initialization processing performed during linear coasting and the second initialization processing performed during cornering, are both used to obtain a precise initial correction factor $K_3$. More specifically, as part of the second initialization processing, the initial correction factor $K_3$ calculated in the second initialization processing is compared with the initial correction factor $K_3$ calculated in the first initialization processing and the initial correction factor $K_3$ which is more precise is taken as a final initial correction factor $K_3$. Further, the same comparison processing is also performed during the first initialization processing, and the initial correction factor $K_3$ which is more precise is taken as a final initial correction factor $K_3$. Consequently, a more precise initial correction factor $K_3$ is obtained.

The CPU 2b then again calculates parameters that have previously been calculated on the basis of an initial correction factor $BK_3$ obtained before the second initialization processing is performed, this time using a correct initial correction factor $K_3$ (step S14). Specifically, the speeds $V3_4$ and $V2_4$ of the right and left rear tires $W_{3\ and\ W4}$ and the slip factor GRs are respectively calculated as expressed by the following equations (41) to (43). Consequently, the speeds $V3_3$ and $V3_4$ and the slip factor GRs from which the effect of the initial difference has been eliminated with high precision are obtained:

$$V3_3 = (K_3/BK_3) \times V2_3 \tag{41}$$

$$V3_4 = (K_3/BK_3) \times V2_4 \tag{42}$$

$$GRs = \{(BK_3/K_3) \times (Rs+1)\} - 1 \tag{43}$$

The CPU 2b then finds a judging value D for judging the drop in air pressure of the tire as expressed by the following equation (44), on the basis of the speeds $V2_1$ and $V2_2$ of the tires $W_1$ and $W_2$ and the newly calculated speeds $V3_3$ and $V3_4$ of the tires $W_3$ and $W_4$ (step S15):

$$D = \frac{\frac{V2_1 + V3_4}{2} - \frac{V2_2 + V3_3}{2}}{\frac{V2_1 + V2_2 + V3_3 + V3_4}{4}} \times 100 \qquad (44)$$

The calculation of the judging value D uses the speeds $V2_1$, $V2_2$, $V3_3$, and $V3_4$ of the respective tires $W_i$ from which the effects of the initial difference and the inner and outer wheel difference of the tire $W_i$ have been eliminated. However, the speeds $V2_1$, $V2_2$, $V3_3$, and $V3_4$ of the tires $W_i$ vary not only on the initial difference and the inner and outer wheel difference but also the lateral acceleration LA of the vehicle and the slip factor. Consequently, the effect of variation factors, including the lateral acceleration LA of the vehicle and the slip factor, are exerted on the judging value D.

Therefore, the CPU 2b subjects the judging value D to correction for eliminating the effects of the variation factors (step S16). Specifically, a correction value C is found by the following equation (45). In the equation (45), A1 and A2 are factors previously stored in the ROM 2c. The factors A1 and A2 are found while the vehicle is traveling in a trial during which it is known that all the tires $W_i$ have normal internal pressure.

$$C = A1 \times LA + A2 \times LA \times GRs \qquad (45)$$

As expressed by the following equation (46), the correction value C is subtracted from the judging value D. Consequently, a new judging value D' from which the effects of the variation factors have been eliminated are acquired:

$$D' = D - C \qquad (46)$$

The CPU 2b then judges whether or not there is a tire $W_i$ whose air pressure has dropped on the basis of the newly found judging value D'(step S17). Specifically, judgment thresholds $D_{TH1}$ and $D_{TH2}$ are set, and it is judging whether or not the judging value D' satisfies the following expression (47):

$$D' < D_{TH1} \text{ or } D' > D_{TH2} \qquad (47)$$

Although the judging value D' is found on the basis of the vehicle speeds $V2_1$, $V2_2$, $V3_3$, and $V3_4$ after the correction using the initial correction factors $K_j$ as described above, the initial correction factors $K_j$ are found by an averaging processing, as described later. Therefore, the larger is the number of data used for averaging, the higher is the precision. Before initial correction factors $K_j$ having sufficient precision are found, therefore, the precision of the judging value D' is changed. Consequently, in the present embodiment, the values of the judgment thresholds $D_{TH1}$ and $D_{TH2}$ are changed depending on the precision of the initial correction factors $K_j$. Processing for changing the judgment thresholds $D_{TH1}$ and $D_{TH2}$ will be described later.

When the judging value D' satisfies the condition given by the foregoing expression (47), it is judged that the air pressure of any one of the tires has dropped. On the other hand, when it is judged that the judging value D' does not satisfy the condition given by the foregoing expression (47), it is judged that there is no tire whose air pressure has dropped.

The CPU 2b thus determines whether or not the air pressure of the tire $W_i$ has dropped while the vehicle is traveling. On the other hand, it makes the device more useful for a driver, to report that a particular tire $W_i$ whose air pressure has dropped than to merely report that the air pressure in one of the tires $W_i$ has dropped without specifying which one. Therefore, the CPU 2b specifies the tire $W_i$ whose air pressure has dropped.

By using the judging value D' found by the foregoing equation (44), the following can be specified:

If D'>0, the reduced pressure tire is $W_1$ or $W_4$.

If D'<0, the reduced pressure tire is $W_2$ or $W_3$.

Furthermore, in this case, if the vehicle is traveling linearly the following can be specified:

If $V2_1 > V2_2$, the reduced pressure tire is $W_1$. If $V2_1 < V2_2$, the reduced pressure tire is $W_2$, If $V3_3 > V3_4$, the reduced pressure tire is $W_3$.

If $V3_3 < V3_4$, the reduced pressure tire is $W_4$.

If the tire $W_i$ whose air pressure has dropped is specified, the result is displayed upon being outputted to the display 3. The display 3 comprises indicator lamps respectively corresponding to the four tires $W_1$, $W_2$, $W_3$, and $W_4$, as shown in FIG. 2, for example. When it is detected that the air pressure of any one of the tires has dropped, the indicator lamp corresponding to the reduced pressure tire is turned on.

Figure 5:
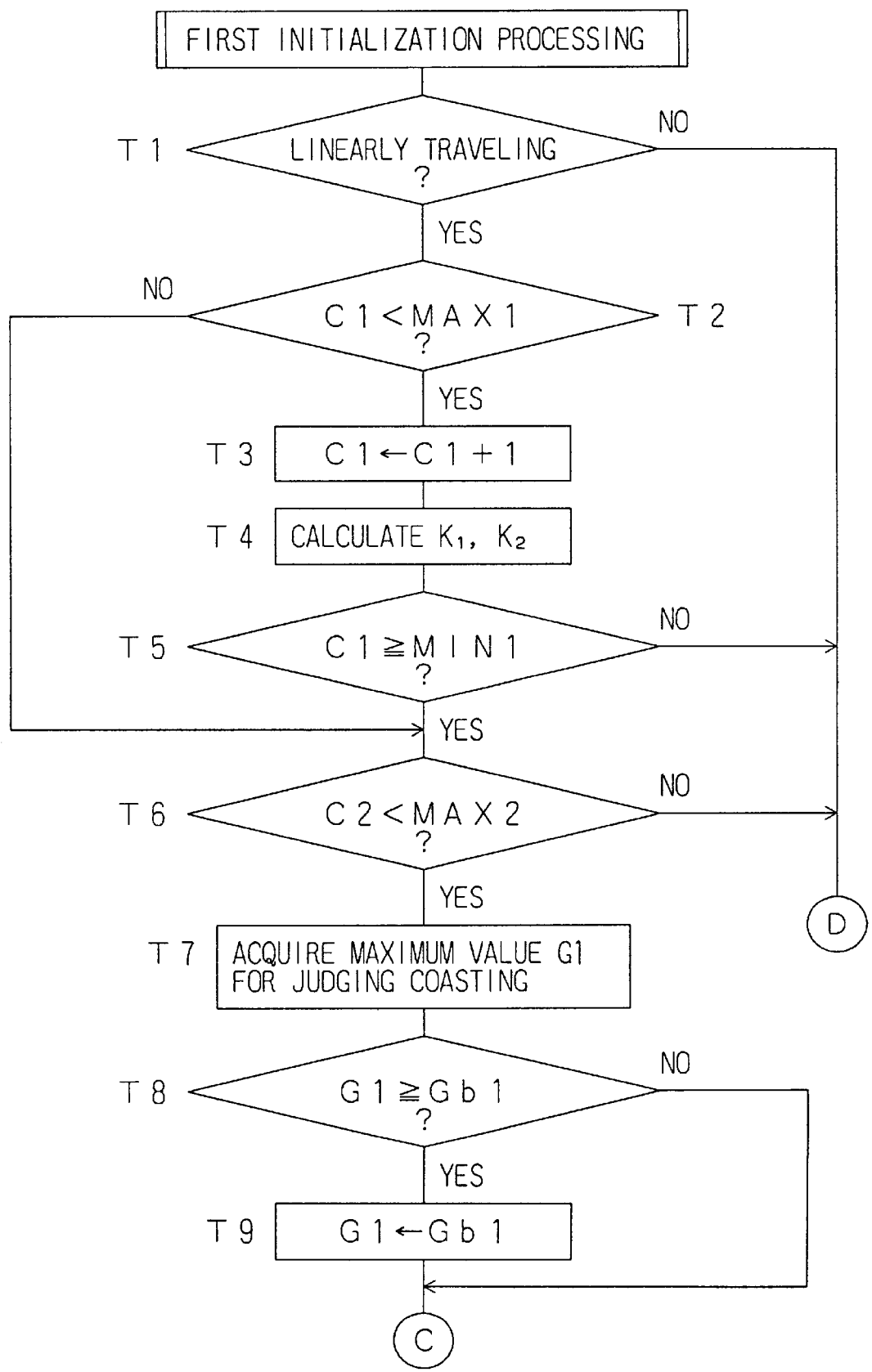
FIGS. 5 and 6 show first and second parts of a flow chart for use in explaining a first initialization processing.
Figure 6:
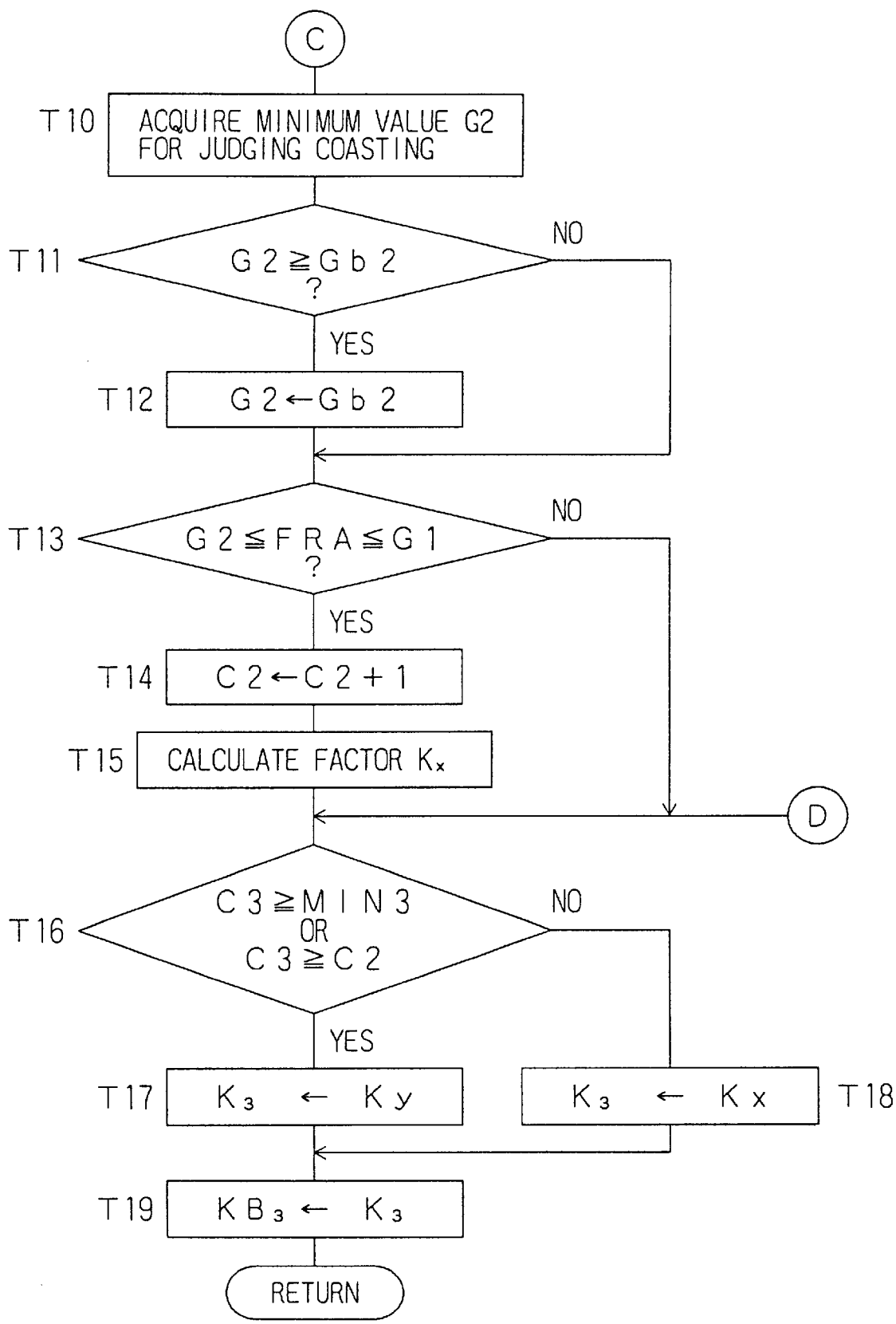

FIGS. 5 and 6 are flow charts for explaining the first initialization processing. In the first initialization processing, the initial correction factors $K_j$ are determined while the vehicle is coasting linearly, as described above. That is, the CPU 2b judges whether or not the vehicle is traveling linearly based on whether or not the output of the steering sensor 5 is within a predetermined allowable range (corresponding to a steering angle range of ±2°, for example) (step T1 in FIG. 5). If the vehicle is not traveling linearly, the processing is terminated.

On the other hand, if the vehicle is traveling linearly, the initial correction factors $K_1$ and $K_2$ are calculated by averaging processing. More specifically, it is first judged whether or not a count value C1 of the counter 21 is not more than a predetermined maximum threshold MAX1 (for example, MAX1=900) (step T2). The count value C1 corresponds to the number of data used for calculating the initial correction factors $K_1$ and $K_2$, and is cleared every time the initializing switch 4 is operated.

If the count value C1 is less than the maximum threshold MAX1, the count value C1 is incremented by "1", after which the initial correction factors $K_1$ and $K_2$ are calculated as expressed by the following equations (48) and (49) (steps T3 and T4). In equations (48) and (49), $BK_1$ and $BK_2$ are respectively the initial correction factors $K_1$ and $K_2$ found in the preceding sampling period and stored in the RAM 2d.

$$K_1 = \frac{C1 - 1}{C1} \times BK_1 + \frac{1}{C1} \times \frac{F_1}{F_2} \qquad (48)$$

$$K_2 = \frac{C1 - 1}{C1} \times BK_2 + \frac{1}{C1} \times \frac{F_3}{F_4} \qquad (49)$$

The initial correction factors $K_1$ to $K_2$ are respectively found as the average of C1 ratios of the rotational velocities $F_1$ and $F_2$ of the right and left front tires $W_1$ and $W_2$ and the average of C1 ratios of the rotational velocities $F_3$ and $F_4$ of the right and left rear tires $W_3$ and $W_4$, at a time of linear travel by the vehicle. Consequently, it is possible to obtain a precise initial correction factor $K_1$ faithfully representing a difference in effective rolling radius between the right and left front tires $W_1$ and $W_2$, and obtain a precise initial correction factor $K_2$ faithfully representing a difference in effective rolling radius between the right and left rear tires $W_3$ and $W_4$.

The CPU 2b then judges whether or not the count value C1 is less than a predetermined minimum threshold MIN1 (for example, MIN1=60) (step T5). If the count value C1 is less than the minimum threshold MIN1, it is considered that the precision of the initial correction factors $K_1$ and $K_2$ is still insufficient. Therefore, the program directly proceeds to the step T16 shown in FIG. 6 without performing the processing of steps T6 to T14 using the initial correction factors $K_1$ and $K_2$. If the count value C1 is not less than the minimum threshold MIN1, it is considered that the precision of the initial correction factors $K_1$ and $K_2$ is sufficiently given to some extent, whereby the program proceeds to step T6.

If it is judged that the count value C1 has reached the maximum threshold MAX1 in step T2, it is considered that the precision of the initial correction factors $K_1$ and $K_2$ is sufficient. Therefore, the program directly proceeds to step T6 without the CPU 2b incrementing the count value C1 and calculating the initial correction factors $K_1$ and $K_2$.

The CPU 2b performs calculations to obtain an initial correction factor $K_3$ in the steps T6 to T15. The calculated initial correction factor $K_3$ is taken as a final initial correction factor $K_3$ only when it is higher in precision than the initial correction factor $K_3$ calculated in the second initialization processing of the preceding period. For convenience, the initial correction factor $K_3$ calculated in the first initialization processing before judging the precision, is taken as an initial correction factor Kx. Further, the initial correction factor $K_3$ calculated in the second initialization processing is taken as a final initial correction factor $K_3$ only when it is higher in precision than the initial correction factor $K_3$ calculated in the first initialization processing. For convenience, therefore, the initial correction factor $K_3$ calculated before judging the precision in the second initialization processing is taken as an initial correction factor Ky.

An initial correction factor Kx is obtained as the average of initial correction factors Kx which have been calculated during the preceding sampling period, similarly to the calculation of the initial correction factors $K_1$ and $K_2$. Collection of whatever number of initial correction factor Kx, results in sufficient precision, to be sufficient.

Therefore, the CPU 2b judges whether or not the count value C2 of the counter 22 is less than a predetermined maximum threshold MAX2 (for example, MAX2=300) (step T6). The count value C2 corresponds to the number of data used for calculating the initial correction factor Kx, and is cleared every time the initializing switch 4 is operated.

If the count value C2 reaches the maximum threshold MAX2, it is considered that the precision of the initial correction factor Kx is sufficient. Therefore, the program directly proceeds to step T16 shown in FIG. 6 without again calculating the initial correction factor Kx. On the other hand, if the count value C2 is less than the maximum threshold MAX2, the process for calculating the initial correction factor Kx is again performed.

The initial correction factor Kx represents a difference in effective rolling radius between the left front tire $W_1$ and the left rear tire $W_3$. If the driving tires $W_1$ and $W_2$ slip while driving or braking, the precision of the calculation factor Kx is decreased. Therefore, the CPU 2b performs judgment processing to determine whether or not the vehicle is coasting, prior to calculating the initial correction factor Kx (steps T7 to T13).

Figure 7:
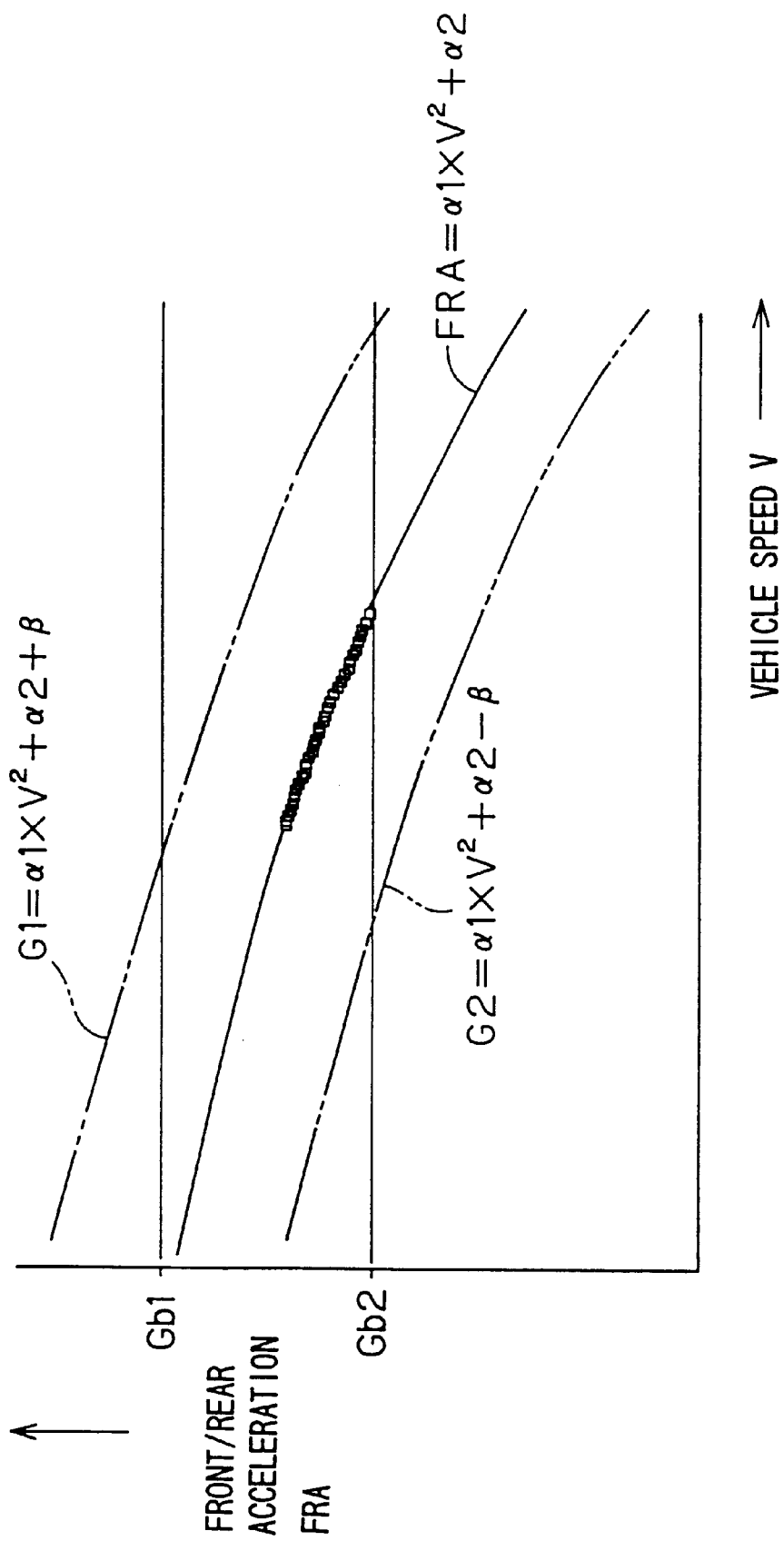
FIG. 7 is a diagram for explaining the relationship between the speed of a vehicle and its lateral acceleration.

It is judged whether or not the vehicle is coasting based upon whether or not the front/rear acceleration FRA of the vehicle is within a predetermined coasting range. The coasting range takes on a maximum value and a minimum value which vary according to on the vehicle speed. Specifically, the higher is the vehicle speed, the narrower the coasting range becomes, as shown by FIG. 7. In the present embodiment, therefore, it can be reliably judged whether or not the vehicle is coasting, irrespective of the vehicle speed, by previously finding the coasting range corresponding to the vehicle speed.

The coasting range corresponding to the vehicle speed is acquired by trial during which the vehicle coasts on a straight level road. More specifically, the vehicle speed at the time of coasting and the front/rear acceleration of the vehicle are calculated. Such work is performed at various vehicle speeds, so that a lot of data are collected. A method of least squares is applied to the data, to find a quadratic expression as given by the following equation (50). In the equation (50), α1 and α2 are constants.

$$FRA = \alpha 1 \times V^2 + \alpha 2 \tag{50}$$

Furthermore, additional quadratic expressions are obtained by shifting the above quadratic expression by β (for example, β=0.2g), in both positive and negative directions. They are respectively expressed by the following equations (51) and (52):

$$G1 = \alpha 1 \times V2 + \alpha 2 + \beta \tag{51}$$

$$G2 = \alpha 1 \times V^{2+\alpha 2 - \beta} \tag{52}$$

The range between the quadratic expressions G1 and G2 is the coasting range. The two quadratic expressions representing the coasting range are stored in the EEPROM 2e.

On the other hand, strictly speaking, a vehicle which is coasting should be decelerating to some extent. Consequently, the maximum value Gb1 of acceleration at which it can be properly judged that the vehicle is coasting, is zero. The minimum value Gb2 of acceleration at which it can be properly judged that the vehicle is coasting is set to a suitable value (for example, –0.04 g). The maximum value Gb1 and the minimum value Gb2 are stored in the EEPROM 2e, similarly to the above two quadratic expressions representing the coasting range.

The CPU 2b substitutes the vehicle speed V found in step S2 shown in FIG. 3 into the foregoing equation (51) in step T7. Consequently, the maximum value G1 is acquired. It is judged whether or not the maximum value G1 is not less than the maximum value Gb1 (step T8). If the maximum value G1 is not less than the maximum value Gb1, the maximum value is corrected to Gb1 (step T9). On the other hand, if the maximum value G1 is less than the maximum value Gb1, G1 is taken as the maximum value as it is.

The CPU 2b then substitutes the vehicle speed V into the foregoing equation (49). As a result, the minimum value G2 is acquired (step T10 in FIG. 6). It is then judged whether or not the acquired minimum value G2 is not less than the minimum value Gb2 (step T11). If the minimum value G2 is not less than the minimum value Gb2, the minimum value is corrected to Gb2 (step T12). On the other hand, if the minimum value G2 is less than the minimum value Gb2, G2 is taken as the minimum value as it is. The coasting range in the current sampling period is thus obtained.

The CPU 2b then judges whether or not the front/rear acceleration FRA of the vehicle which is calculated in the current sampling period is within the obtained coasting range (step T13). If the front/rear acceleration FRA of the vehicle which is calculated in the current sampling period is not within the coasting range, it cannot be considered that the vehicle is coasting. Therefore, the program directly proceeds to step T16 without calculating the initial correction factor Kx. On the other hand, if the front/rear acceleration FRA of the vehicle is within the coasting range, the count value C2 is incremented by "1", and the initial correction factor Kx is calculated, as expressed by the following equation (53) (steps T14 and T15). In the following equation (53), BKx is an initial correction factor Kx calculated in the preceding sampling period and stored in the RAM 2d.

$$Kx = \frac{C2-1}{C2} \times BKx + \frac{1}{C2} \times \frac{F_1 + K_1 \times F_2}{F_3 + K_2 \times F_4} \qquad (53)$$

The CPU 2b then compares the calculated initial correction factor Kx with the initial correction factor Ky calculated in the second initialization processing in the preceding sampling period in order to obtain the final initial correction factor $K_3$. As a criterion for comparison, the count value C2 of the counter 22, corresponding to the number of data used for calculating the initial correction factor Kx, and a count value C3 of the counter 23, corresponding to the number of data used for calculating the initial correction factor Ky, are used. That is, the larger is the number of data used for averaging, the higher is the precision because the effect of noise can be eliminated.

Therefore, the CPU 2b judges if the count value C3 of the counter 23 is not less than a predetermined minimum value MIN3 (for example, MIN3=50) or the count value C3 is not less than the count value C2 (step T16).

If the count value C3 is not less than the minimum threshold MIN3, or the count value C3 is not less than the count value C2, it is considered that the initial correction factor Ky is higher in precision than the initial correction factor Kx, in which case the initial correction factor Ky is selected as a final initial correction factor $K_3$ (step T17). On the other hand, if the count value C3 is less than the minimum threshold MIN3, and the count value C3 is less than the count value C2, it is considered that the initial correction factor Kx is higher in precision than the initial correction factor Ky, in which case the initial correction factor Kx is selected as the final initial correction factor $K_3$ (step T18). The selected initial correction factor $K_3$ is stored as an initial correction factor BK3 in the RAM 2d (step T19).

Figure 8:
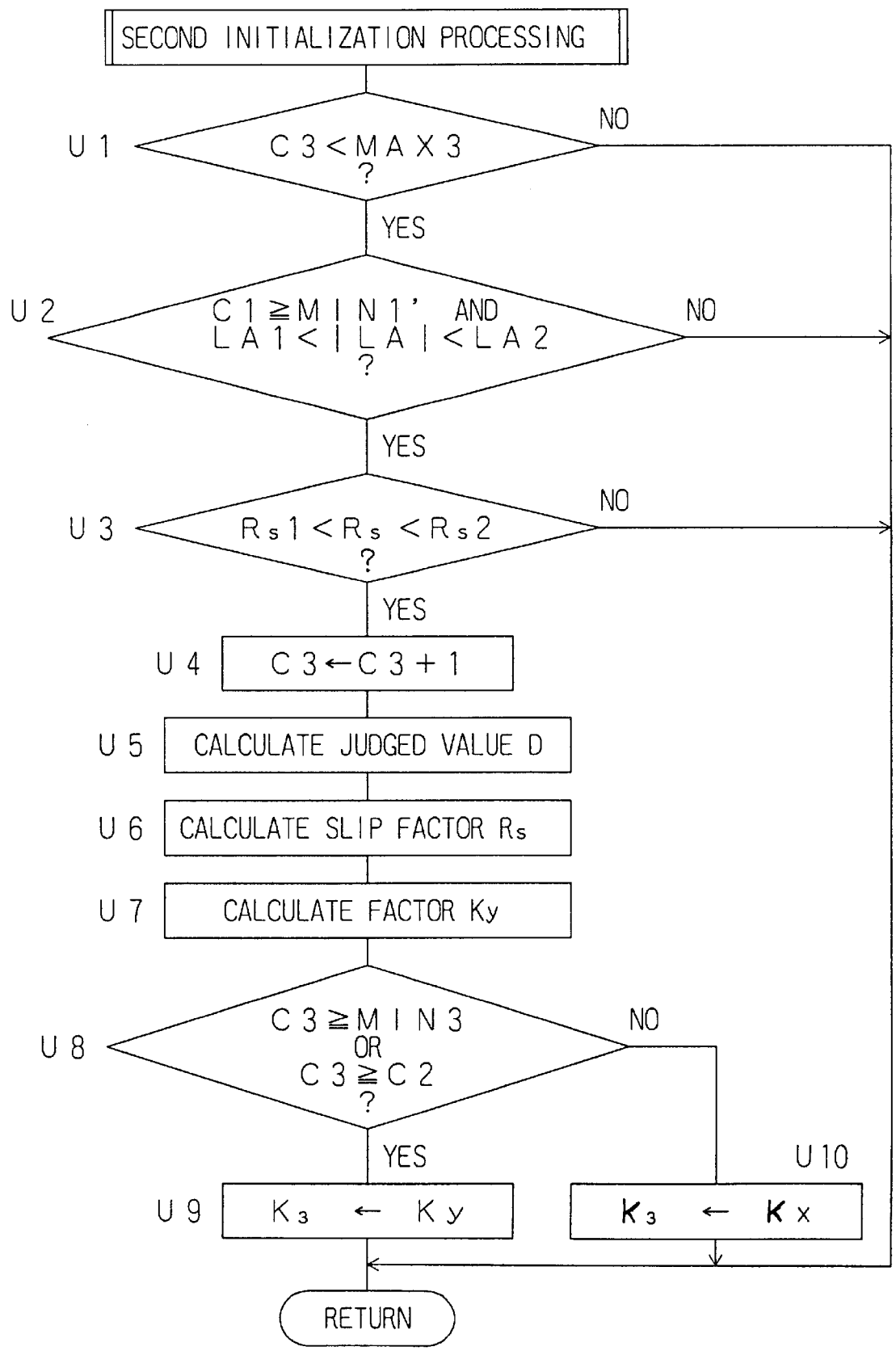
FIG. 8 is a flow chart for use in explaining a second initialization processing.

FIG. 8 is a flow chart for explaining the second initialization processing. In the second initialization processing, the initial correction factor Ky is calculated by averaging past initial correction factors Ky which have been calculated during the preceding sampling period. Therefore, the CPU 2b judges whether or not the count value C3 of the counter 23 is less than a predetermined maximum threshold MAX3 (for example, MAX3=150) (step U1). If the count value C3 reaches the maximum threshold MAX3, it is considered that the initial correction factor Ky is the average of a preset number of data deemed to provide sufficient precision, and the processing is terminated. On the other hand, if the count value C3 is less than the maximum threshold MAX3, the program proceeds to the subsequent step U2.

The CPU 2b judges whether or not the vehicle is cornering, and whether or not the count value C1 is not less than the minimum threshold MIN1' (for example, MIN1'= 300).

It is judged whether or not the vehicle is cornering according to whether or not the lateral acceleration LA of the vehicle satisfies the condition given by the following expression (54). In the following expression (54), LA1=0.08 g, and LA2=0.4 g.

$$LA1 < |LA| < LA2 \qquad (54)$$

The reason why a judgment as to whether or not the count value C1 is not less than the minimum threshold MIN1' is used as one of criteria for judgment, is that the initial correction factors $K_1$ and $K_2$ are used for calculating the lateral acceleration LA of the vehicle, as expressed by the foregoing equations (39), (38), (34) to (37), and (24) to (27). That is, the larger is the number of data used for averaging, the higher is the precision of the initial correction factors $K_1$ and $K_2$. If the number of data is small, therefore, the precision of the lateral acceleration LA of the vehicle is insufficient. In this case, an erroneous judgment may be made in step U2. Further, if the precision of the lateral acceleration LA of the vehicle is low, the precision of the initial correction factor Ky found by the following equation (56) is decreased.

The lateral acceleration LA of the vehicle can be also obtained from the output of the steering sensor 5 and the vehicle speed. The lateral acceleration LA of the vehicle thus obtained has no relation to the initial correction factors $K_1$ and $K_2$. In this case, therefore, the necessity of the criterion for the judgment whether or not the count value C1 is not less than the minimum threshold MIN1', is eliminated.

If the vehicle is not cornering, or the count value C1 is less than the minimum threshold MIN1', it is considered that the initial correction factor Ky cannot be calculated with high precision, so the processing is terminated. On the other hand, if the vehicle is cornering, and the count value C1 is not less than the minimum threshold MIN1', the program proceeds to the subsequent step U3.

The CPU 2b judges whether or not the slip factor Rs of the driving tires $W_1$ and $W_2$ calculated in step S12 shown in FIG. 4 satisfies the following expression (55) in step U3. This judgment processing is based on the discovery by the inventors of the present invention that the precision of the initial correction factor Ky is decreased when the slip factor Rs does not satisfy the expression (55). In the expression (55), Rs1 and Rs2 are constants, for example Rs1=0 and Rs2=0.008:

$$Rs1 < Rs < Rs2 \qquad (55)$$

Therefore, the foregoing expression (55) is not satisfied, the processing is terminated. On the other hand, if the foregoing expression (55) is satisfied, the count value C3 of the counter 23 is incremented by "1", and the judging value D and the slip factor Rs are calculated. Further, the initial correction factor Ky is calculated on the basis of the calculated judging value D and slip factor Rs (steps U4, U5, U6, and U7).

More specifically, the initial correction factor Ky is calculated in accordance with the following equation (56) derived from an equation obtained by modifying a correction expression for correcting cornering relating to the judging value D and an expression for calculating the slip factor Rs. In equation (56), BKy is an initial correction factor Ky calculated in the preceding sampling period and stored in the RAM 2d.

$$Ky = \frac{C3-1}{C3} \times BKy + \frac{1}{C3} \times \frac{1}{Rs+1} \times \frac{F_1 + K_1 \times F_2}{F_3 + K_2 \times F_4} \qquad (56)$$

The judging value D is calculated as in the foregoing equation (44). Further, the slip factor Rs is calculated in accordance with the forgoing equation (12) on the basis of the calculated judging value D and lateral acceleration LA of the vehicle.

Thereafter, the CPU 2b substitutes the calculated slip factor Rs into the foregoing equation (56). Consequently, the initial correction factor Ky is obtained.

The CPU 2b then compares the precision of the calculated initial correction factor Ky with the precision of the initial correction factor Kx calculated in the first initialization processing, in the current sampling period, in order to obtain the final initial correction factor $K_3$. As a criterion for comparison, the count value C2 of the counter 22 corresponding to the number of data used for calculating the initial correction factor Kx, and the count value C3 of the counter 23 corresponding to the number of data used for calculating the initial correction factor Ky, are used, as in the first initialization processing. That is, the CPU 2b judges whether the count value C3 of the counter 23 is not less than the minimum threshold MIN3, or the count value C2 (step U8).

If the count value C3 is not less than the minimum threshold MIN3, or the count value C2, it is considered that the initial correction factor Ky is higher in precision than the initial correction factor Kx, in which case the initial correction factor Ky is selected as the final initial correction factor $K_3$ (step U9). On the other hand, if the count value C3 is less than the minimum threshold MIN3, or less than the count value C2, it is considered that the initial correction factor Kx is higher in precision than the initial correction factor Ky, in which case the initial correction factor Kx is selected as the final initial correction factor $K_3$ (step U10).

Description is now made of processing for changing the judgment thresholds $D_{TH1}$ and $D_{TH2}$ that are used in the air pressure drop judging process in step S17 shown in FIG. 4. As described in the foregoing, the judgment thresholds $D_{TH1}$ and $D_{TH2}$ are changed according to the precision of the initial correction factor $K_j$. The precision of the initial correction factor $K_j$ is represented by the number of data used for calculating the initial correction factor $K_j$, in the above-described first initialization processing and the second initialization processing. In the processing for changing the judgment thresholds $D_{TH1}$ and $D_{TH2}$, therefore, the count values C1, C2, and C3 of the counters 21, 22, and 23 are used as parameters for judging the precision of the initial correction factor $K_j$.

The CPU 2b judges whether or not the first condition under which the count value C1 reaches the maximum threshold MAX1 and the count value C3 reaches the maximum threshold MAX3, is satisfied. That is, it is judged whether or not to terminate the calculation of the initial correction factor $K_j$.

The reason why with satisfaction of the first condition, the count value C3 corresponding to the number of data used for calculating the initial correction factor Ky is used as a criterion for a judgment whether or not the calculation of the initial correction factor $K_3$ should be terminated, is that the precision of the initial correction factor Kx is decreased when the vehicle is climbing. That is, even if the front/rear acceleration FRA of the vehicle is in the coasting range at the time of climbing, driving forces are transmitted to the driving tires $W_1$ and $W_2$, whereby the vehicle is not actually coasting. In this case, therefore, the precision of the initial correction factor Kx is low.

If the first condition is satisfied, it is considered that the precision of the initial correction factor $K_j$ is sufficient, whereby a reference value $D_0$ (for example, $D_0$=0.1) is set as each of the judgment thresholds $D_{TH1}$ and $D_{TH2}$. On the other hand, if the first condition is not satisfied, the CPU 2b examines whether the precision of the initial correction factor $K_j$ is relatively high or low, or too low to judge the drop in air pressure.

Specifically, the CPU 2b first judges whether or not the second condition, under which the count value C1 is not less than $m_1$ (for example, $m_1$=2/3) times the maximum threshold MAX1, and the count value C3 is not less than $m_1$ times the maximum threshold MAX3, is satisfied, in order to examine whether or not the precision of the initial correction factor $K_j$ is relatively high. If the second condition is satisfied, it is considered that the precision of the initial correction factor $K_j$ is relatively high, whereby a value equal to $n_1$ (for example, $n_1$=1.33) times the reference value $D_0$, is set as each of judgment thresholds $D_{TH1}$ and $D_{TH2}$.

On the other hand, if the second condition is not satisfied, it is then judged whether or not the third condition, under which the count value C1 is more than $m_2$ ($m_2<m_1$; $m_2$=1/3, for example) times the maximum threshold MAX1, and the count value C2 is not less than $m_2$ times the maximum threshold MAX2, or the count value C3 is not less than $m_2$ times the maximum threshold MAX3, is satisfied, in order to examine whether the precision of the initial correction factor $K_j$ is relatively low or too low.

If the third condition is satisfied, it is considered that the precision of the initial correction factor $K_j$ is relatively low but is not too low, whereby a value which is equal to $n_2$ ($n_2>n_1$; $n_2$=1.66, for example) times the reference value $D_0$, is set as each of the judgment thresholds $D_{TH1}$ and $D_{TH2}$. On the other hand, if the third condition is not satisfied, it is considered that the precision of the initial correction factor $K_j$ is too low, whereby the judgment thresholds $D_{TH1}$ and $D_{TH2}$ are not set. In this case, no air pressure drop judgment processing is performed.

As described in the foregoing, according to the present embodiment, when the vehicle is traveling in the usual manner, it may be detected that the vehicle is traveling linearly. At this time, the initial correction factors $K_1$ and $K_2$ are calculated. Further, when the vehicle is traveling in the usual manner, it may be detected that the vehicle is coasting linearly. At this time, the initial correction factor Kx is calculated. Further, when the vehicle is traveling in the usual manner, it may be detected that the vehicle is cornering. At this time, the initial correction factor Ky is calculated. The one of the initial correction factors Kx and Ky which is higher in precision is taken as the final initial correction factor $K_3$.

Even if the user does not intentionally cause the vehicle to linearly coast, therefore, it is possible to obtain precise initial correction factors $K_j$. Moreover, with respect to the initial correction factor $K_3$, the one of the initial correction factors Kx and Ky, respectively calculated in different traveling states, which is higher in precision is taken as the initial correction factor $K_3$, whereby the precision thereof is higher, as compared with that in a case where only the calculated value in a particular one of the traveling states, is used.

The precise initial correction factor $K_j$ can be thus simply obtained. Therefore, it is possible to significantly reduce the burden on the user (driver) as well as to improve traffic safety.

Although description has been made of one embodiment of the present invention, the present invention is not limited to the above-mentioned embodiment. In the above-mentioned embodiment, processing for calculating the initial correction factor Kx is used when the vehicle is coasting linearly, while processing for calculating the initial correction factor Ky is used in a case where the vehicle is cornering, and one of the initial correction factors Kx and Ky which is higher in precision is selected as the final initial correction factor $K_3$. However, only a preselected one of the two calculations may be performed, and the initial correction factor Kx or Ky may be used as the initial correction factor $K_3$ as it is. Further, which of the processing should be performed may be manually selectable by the user. Even with such a construction, it is possible to calculate the precise initial correction factor $K_3$ simply.

Although the present invention has been described and illustrated in detail, it is clearly understood that the description is by way of illustration and example only and is not to be taken by way of limitation, the spirit and scope of the present invention being limited only by the terms of the appended claims.

This application claims priority benefits under 35 USC § 119 of Japanese Patent Application-Serial No. 9-12748 filed in the Japanese Patent Office on Jan. 27, 1997, the disclosure of which is incorporated herein by reference.

What is claimed is:

1. A device for determining a correction factor for correcting an output of a rotational velocity detector, the detector for detecting the rotational angular velocities of four tires mounted on a vehicle, the device comprising:

means for judging whether or not the vehicle is traveling linearly; and means for calculating initial correction factors K1 and K2 when the linear travel judging means judges that the vehicle is traveling linearly, wherein the initial correction factor K1 is for eliminating an effect of a difference in effective rolling radius depending on an initial difference between right and left front tires on the rotational velocity of the tires and the initial correction factor K2 is for eliminating an effect of a difference in effective rolling radius depending on an initial difference between right and left rear tires on the rotational velocities of the tires on the basis of the output of the rotational velocity detector.

2. A device according to claim 1, further comprising:

coasting judging means for judging whether or not the vehicle is coasting, and means for calculating an initial correction factor K3 when the linear travel judging means judges that the vehicle is traveling linearly and the coasting judging means judges that the vehicle is coasting, wherein the initial correction factor K3 is for eliminating an effect of a difference in effective rolling radius on the rotational velocities of the tires, depending on an initial difference between a front tire and a rear tire on the same side of the vehicle, and wherein the initial correction factor K3 is calculated on the basis of the calculated initial correction factors K1 and K2 and the output of the rotational velocity detector.

3. A device according to claim 1, further comprising:

cornering judging means for judging whether or not the vehicle is cornering, means for determining a slip factor Rs, and means for calculating an initial correction factor K3 when the cornering judging means judges that the vehicle is cornering, wherein the initial correction factor K3 is for eliminating an effect of a difference in effective rolling radius on the rotational velocities of the tires, depending on an initial difference between a front tire and a rear tire on the same side of the vehicle, and wherein the initial correction factor K3 is calculated by substituting the output of the rotational velocity detector, the calculated initial correction factors K1 and K2 and the determined slip factor Rs into a preset correction factor expression.

4. A device according to claim 3, further comprising:

means for calculating a judging value D for judging whether a drop in air pressure of at least one of the tires has occurred, on the basis of the output of the rotational velocity detector, wherein the means for determining the slip factor Rs includes means for substituting a lateral acceleration LA of the vehicle and the judging value D into a slip factor expression, to find the slip factor Rs.

5. A device according to claim 3, further comprising:

means for judging whether or not the slip factor Rs has a value within a preset range, and means for inhibiting the calculation of the initial correction factor K3 if the slip factor judging means judges that the slip factor Rs takes a value within the preset range.

6. A device according to claim 1, further comprising:

means for calculating a lateral acceleration LA of the vehicle on the basis of the output of the rotational velocity detector, means for calculating a judging value D for judging whether there has been a drop in air pressure of at least one of the tires on the basis of the output of the rotational velocity detector, means for substituting a lateral acceleration LA of the vehicle and the judging value D thus calculated into a slip factor expression, to find a slip factor Rs, and means for calculating an initial correction factor K3 when the cornering judging means judges that the vehicle is cornering, wherein the initial correction factor K3 is for eliminating an effect of a difference in effective rolling radius on the rotational velocities of the tires, depending on an initial difference between a front tire and a rear tire on the same side of the vehicle, and wherein the initial correction factor K3 is calculated by substituting the output of the rotational velocity detector, the calculated initial correction factors K1 and K2, and the determined slip factor Rs into an initial correction factor expression.

7. A device according to claim 1, further comprising:

coasting judging means for judging whether or not the vehicle is coasting, means for calculating an initial correction factor Kx when the linear travel judging means judges that the vehicle is traveling linearly and the coasting judging means judges that the vehicle is coasting, wherein the initial correction factor Kx is for eliminating an effect of a difference in effective rolling radius on the rotational velocities of the tires, depending on an initial difference between a front tire and a rear tire on the same side of the vehicle, and wherein the initial correction factor Kx is calculated on the basis of the calculated initial correction factors K1 and K2 and the output of the rotational velocity detector;

cornering judging means for judging whether or not the vehicle is cornering;

means for determining a slip factor Rs, means for calculating an initial correction factor Ky when the cornering judging means judges that the vehicle is cornering, wherein the initial correction factor Ky is for eliminating an effect of a difference in effective rolling radius on the rotational velocities of the tires, depending on the initial difference between the front tire and the rear tire, and wherein the initial correction factor Ky is calculated by substituting the output of the rotational velocity detector, the calculated initial correction factors K1 and K2 and the determined slip factor Rs into a preset initial correction factor expression; and means for judging which of the calculated initial correction factors Kx and Ky is higher in precision, means for taking the initial correction factor Kx or Ky, which is judged to be higher in precision as a final initial correction factor K3 for eliminating the effect on the rotational velocities of the tires of the difference in effective rolling radius depending on the initial difference between the front tire and the rear tire.

8. A device according to claim 7, further comprising:

means for calculating a judging value D for judging whether a drop in air pressure of the tires has occurred, on the basis of the output of the rotational velocity detector, wherein the means for judging value D into a slip factor expression, to find the slip factor Rs.

9. A device according to claim 7, further comprising:

means for judging whether or not the slip factor Rs has a value within a preset range, and means for inhibiting the calculation of the initial correction factor K3 if the slip factor judging means judges that the slip factor Rs has a value with the preset range.

10. A device according to claim 1, wherein the means for calculating the initial correction factor Kx includes means for subjecting a first plurality of data to averaging, the means for calculating the initial correction factor Ky includes means for subjecting a second plurality of data to averaging, and the means for judging which of the initial correction factors Kx and Ky is higher in precision includes means for judging the precision on the basis of the numbers of the data which have been subjected to the respective averaging.

11. A device according to claim 1, further comprising:

coasting judging means for judging whether or not the vehicle is coasting, means for calculating an initial correction factor Kx when the linear travel judging means judges that the vehicle is traveling linearly and the coasting judging means judges that the vehicle is coasting, wherein the initial correction factor Kx is for eliminating an effect of a difference in effective rolling radius on the rotational velocities of the tires, depending on an initial difference between a front tire and a rear tire on the same side of the vehicle, and wherein the initial correction factor Kx is calculated on the basis of the calculated initial correction factors K1 and K2 and the output of the rotational velocity detector;

means for calculating a lateral acceleration LA of the vehicle on the basis of the output of the rotational velocity detector, means for calculating a judging value D for judging whether a drop in air pressure of the tires has occurred, on the basis of the output of the rotational velocity detector, means for substituting a lateral acceleration LA of the vehicle and the judging value D thus calculated into a slip factor expression, to calculate a slip factor Rs, and cornering judging means for judging whether or not the vehicle is cornering on the basis of the calculated lateral acceleration LA of the vehicle, means for calculating an initial correction factor Ky when the cornering judging means judges that the vehicle is cornering, wherein the initial correction factor Ky is for eliminating an effect of a difference in effective rolling radius on the rotational velocities of the tires, depending on an initial difference between the front tire and the rear tire, and wherein the initial correction factor Ky is calculated by substituting the output of the rotational velocity detector, the calculated initial correction factors K1 and K2, and the calculated slip factor Rs into an initial correction factor expression; and means for judging which of the calculated initial correction factors Kx and Ky is higher in precision, means for taking the initial correction factor Kx or Ky, which is judged to be higher in precision as a final initial correction factor K3 for eliminating the effect on the rotational velocities of the tires of the difference in effective rolling radius depending on the initial difference between the front tire and the rear tire.

* * * * *